(12) United States Patent
Van Leverink

(10) Patent No.: US 9,004,383 B2
(45) Date of Patent: Apr. 14, 2015

(54) DEVICE FOR PRODUCING CHOCOLATE

(75) Inventor: Simon Jakob Van Leverink, Alkmaar (NL)

(73) Assignee: Duyvis Weiner B.V., Koog Aan de Zaan (NL)

( * ) Notice: Subject to any disclaimer, the term of this patent is extended or adjusted under 35 U.S.C. 154(b) by 577 days.

(21) Appl. No.: 12/936,081

(22) PCT Filed: Apr. 6, 2009

(86) PCT No.: PCT/EP2009/054086
§ 371 (c)(1),
(2), (4) Date: Nov. 30, 2010

(87) PCT Pub. No.: WO2009/121973
PCT Pub. Date: Oct. 8, 2009

(65) Prior Publication Data
US 2011/0147507 A1    Jun. 23, 2011

(30) Foreign Application Priority Data

Apr. 4, 2008  (EP) .................................. 08103382

(51) Int. Cl.
| | |
|---|---|
| B02C 19/00 | (2006.01) |
| B01F 7/30 | (2006.01) |
| A23G 1/10 | (2006.01) |
| A23G 1/12 | (2006.01) |
| B01F 5/10 | (2006.01) |
| B01F 13/10 | (2006.01) |
| B02C 17/16 | (2006.01) |
| B02C 17/18 | (2006.01) |
| B01F 7/00 | (2006.01) |

(52) U.S. Cl.
CPC . *B01F 7/302* (2013.01); *A23G 1/10* (2013.01); *A23G 1/12* (2013.01); *B01F 5/104* (2013.01); *B01F 7/00991* (2013.01); *B01F 13/1047* (2013.01); *B01F 2013/1086* (2013.01); *B01F 2215/0019* (2013.01); *B02C 17/16* (2013.01); *B02C 17/183* (2013.01)

(58) Field of Classification Search
USPC .................................. 99/348, 357; 241/101.8
See application file for complete search history.

(56) References Cited

U.S. PATENT DOCUMENTS 3,058,413 A   10/1962   Cavalieri

FOREIGN PATENT DOCUMENTS

| | | |
|---|---|---|
| CN | 1612831 A | 5/2005 |
| DE | 1167171 | 4/1964 |

(Continued)

OTHER PUBLICATIONS

Chinese Office Action; Mailed Aug. 2, 2013 for the corresponding CN Application No. 200980118233.9.

(Continued)

*Primary Examiner* — Mark Rosenbaum
(74) *Attorney, Agent, or Firm* — Mendelsohn, Drucker & Dunleavy, P.C.

(57) ABSTRACT

The invention relates to a device (1) for producing chocolate by mixing and grinding ingredients, such as cacao mass, cacao butter, sugar and/or milk powder, comprising a mixer (3), a grinder (4), and means for passing the mixture from the mixer (3) to the grinder (4). The mixer (3) comprises a toroidal, preferably annular vessel (6) for receiving and mixing the ingredients.

16 Claims, 1 Drawing Sheet

(56) References Cited

FOREIGN PATENT DOCUMENTS

| | | | |
|---|---|---|---|
| EP | 0157454 | * | 10/1985 |
| EP | 294876 | | 1/1988 |
| EP | 442544 | | 8/1991 |
| FR | 1031141 | | 6/1953 |
| GB | 1251043 | | 1/1968 |
| GB | 1251044 | | 1/1968 |
| GB | 1251043 | | 10/1971 |
| JP | S37-012429 B | | 10/1962 |
| JP | S40-7115 | | 4/1965 |
| JP | 63214329 | | 9/1988 |
| WO | WO2005077197 A1 | | 8/2005 |

OTHER PUBLICATIONS

Notice of Rejection; Received on Jan. 28, 2013 for the corresponding JP Application No. 2011502396.

Chinese Office Action; Mailed Dec. 18, 2013 for corresponding CN Application No. 200980118233.9.

Japanese Office Action; Mailed Mar. 18, 2014 for the corresponding JP Application No. 2011-502396.

Ghanese Examination Report; Mailed Jul. 3, 2014 for the related GH Application No. AP/P/2010/005460.

Malaysian Examination Report; Mailed Jul. 15, 2014 for the related MY Application No. PI 2010004581.

* cited by examiner

DEVICE FOR PRODUCING CHOCOLATE

This application is a 371 continuation of International application no. PCT/EP2009/054086, filed on Apr. 6, 2009, in the English language designating the United States of America.

The invention relates to a device for producing chocolate by mixing and grinding ingredients, such as cacao mass, cacao butter, sugar and/or milk powder, comprising a mixer, a grinder, and means for passing the obtained mixture from the mixer to the grinder.

European patent application EP 442 544 relates to a method and device for mixing and grinding chocolate. The embodiment shown schematically in FIG. 1 of EP 442 544 comprises a grinding device 1 in which the components of the process mass are pre-mixed and ground. A pump 2 circulates the process mass to a ball mill 3 which is connected with its outlet via a taste-changer 4 to the intake of the grinding device 1.

GB 1 251 043 relates to a process wherein constituents in a chocolate material are cyclically mixed and comminuted. The material is first premixed and then comminuted in a stirrer-type ball mill. Sugar, cocoa beans/liquor, milk powder and cocoa butter are premixed at 22 in FIG. 4 of GB 1 251 043, pumped at 23 to mixer vessels 24 or 25 where they are aerated, and pumps 26, 33 deliver the material to a mill 29. Aeration is effected by spreading the material over a spinning member 7 (FIG. 5) so that it forms a film and feeding heated and/or irradiated air via a duct 8 on to the film. The mill is charged with alloy steel, or ceramic balls of ¼" to ⅜" diameter, which are retained by a mesh screen. The mixing and/or grinding vessels and pipe lines may be jacketed for heating or cooling. The mixer comprises a shaft 40 (FIG. 5) carrying arms 42 and radial agitator members 43 which present an edge 44 to the material. A further vertical agitator 46 is mounted on the other side of the shaft and stirrer shaft 40 carries a screw 47 which is rotated by gearing in a radial arm 48 and produces vertical movement of the material. A second form of mixer includes a spiral scraper 49 and gear box arm 50 (FIG. 6). A surface-tension controlling agent, e.g. lecithin, may be introduced by a metering valve.

It is an object of the present invention to provide a more compact device for producing chocolate.

To this end, the device according to the present invention is characterized in that the mixer comprises a toroidal, preferably annular vessel for receiving and mixing the ingredients. It is preferred that the grinder, preferably a ball mill, is located in the central space of the toroidal vessel.

It is further preferred that the mixer defines a toroidal, preferably annular mixing chamber accommodating at least one mixing element, which is rotatable about its axis and/or about the central axis of the toroidal vessel.

In a another aspect, the device comprises a taste-changer, preferably at least connected to an inlet of the mixer.

In yet a further aspect, the mixer, the grinder, and, if present, the taste-changer form a self-contained unit, i.e. are configured such that installation of the device requires no connection of pipes or pumps and is preferably reduced to positioning the unit and connecting the unit to a source of electricity.

The invention will now be explained in more detail with reference to the drawings, which schematically show a preferred embodiment according to the present invention.

Figure 1:
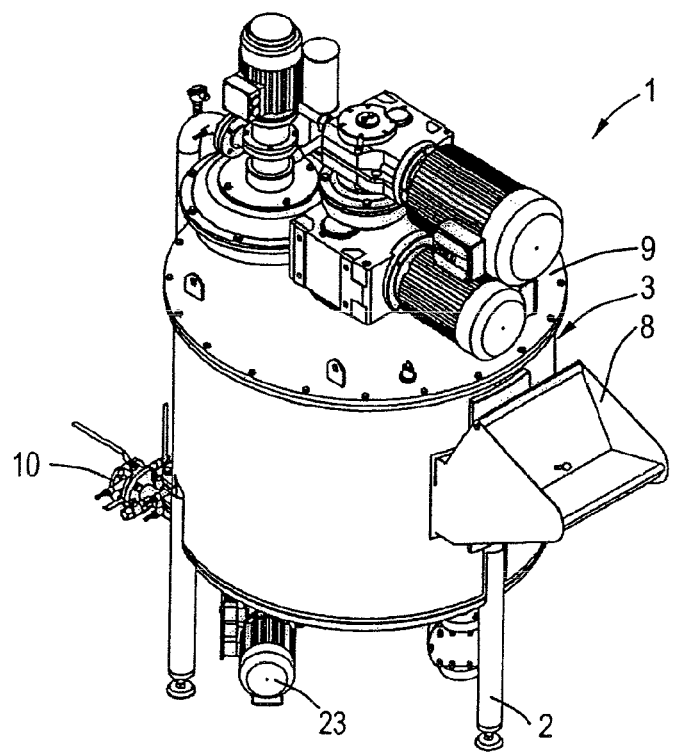
FIG. 1 is a perspective view of a mixer grinder according to the present invention.
Figure 2:
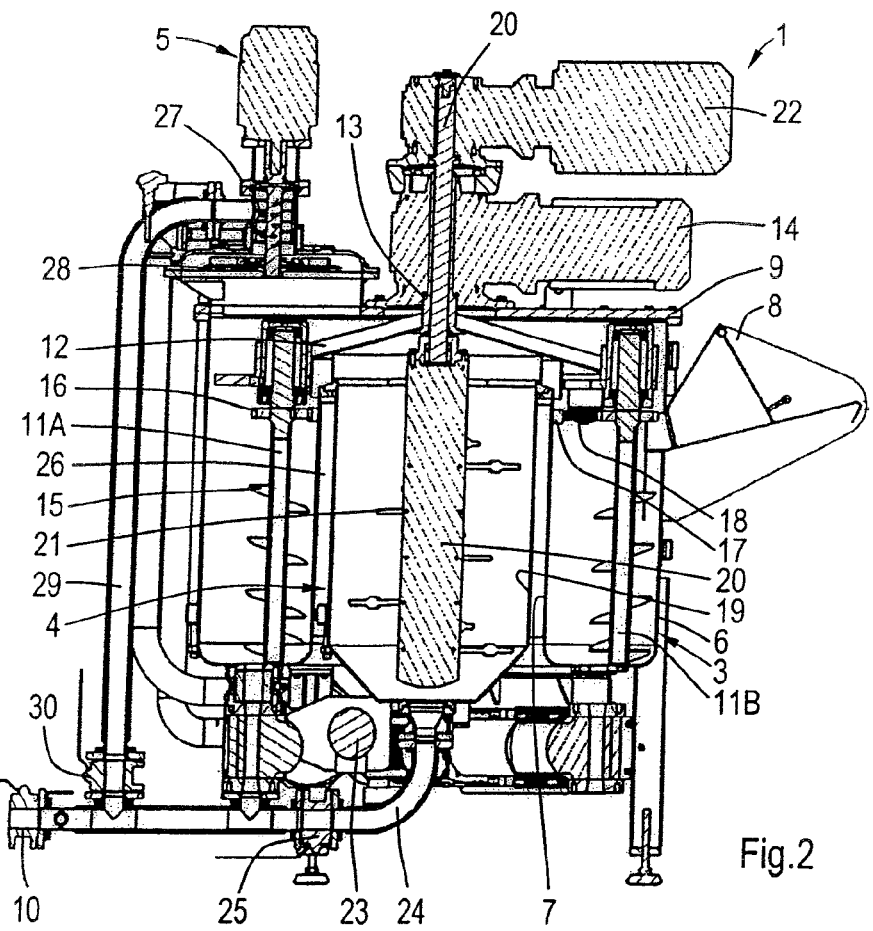
FIG. 2 is a cross-section of the mixer grinder shown in FIG. 1.

FIGS. 1 and 2 show a device 1 for producing chocolate comprising a frame 2, a mixer 3, a grinder 4, a taste-changer 5, and means, such as pipes and pumps, for passing a mixture of ingredients from the mixer 3 to the grinder 4 and/or the taste-changer 5.

The mixer 3, in this field also referred to as "pre-mixer", comprises an annular vessel 6, defining a ring-shaped (endless) mixing chamber for receiving the ingredients and defining a central space 7. The outer wall of the vessel 6 comprises an inlet 8 for feeding the ingredients to the vessel 6. The top of the vessel 6 is closed by a removable lid 9 and its bottom communicates with an outlet valve 10. A plurality of mixing elements 11 is located inside the vessel 6, each rotatable about its axis and about the central axis of the annular vessel 6.

More specifically, in the example shown in the Figures, the mixing elements 11 are rotatably mounted on arms 12 connected to a first shaft 13 that coincides with the central axis of the annular vessel 6 and that is operatively coupled to a motor 14 mounted, e.g., on top of the vessel 6. The arms 12 have different lengths, such that a first (set of) mixing element(s) 11A is located near the inner wall of the vessel 6 nearest the central axis and a second (set of) mixing element(s) 11B is located near the inner wall farthest from the central axis of the vessel 6.

Each of the mixing elements 11 comprises a screw 15 extending over the greater part of the height of the vessel 6. A gear 16 is provided near the upper end of each of the mixing elements 11, which gear 16 meshes with a toothed ring 17 extending along the circumference of the inner wall of the vessel 6 nearest the central axis. In this example, the lead of the screw(s) 15 on the first mixing element(s) 11A is opposite to that of the screw(s) 15 on the second mixing element(s) 11B and a further gear 18 is provided between the second mixing element(s) 11B and the toothed ring 17, such that, upon rotation of the mixing elements 11, upwards transport of the mixture is effected by all mixing elements 11.

The grinder 4 comprises a stirrer-type ball mill 4, known in itself and in turn comprising a cylindrical vessel 19 filled with, e.g., hardened steel balls (not shown), and a central shaft 20 provided with radially extending stirring arms 21 and operatively coupled to a motor 22. The ball mill 4 is located in the central space 7 of the annular vessel 6 and connected, via a pump 23, pipes 24, and a cut-off valve 25, to an outlet of the mixer 3. The top of the grinder communicates with the top of the mixer. To further enhance the compact build of the device 1 according to the present invention, the shafts 13, 20 with which the mixer 3 and the grinder 4 are coupled to the respective motors 14, 22 are coaxial. Thermal insulation 26 is provided between the grinder 4 and the mixer 3.

The taste-changer 5, also known in itself, comprises a central shaft 27 provided with radial pins and, at its lower end, a disc 28, and a ventilator (not shown) Suitable taste-changers are described in EP 294 876 and GB 1 251 044. The taste-changer 5 is connected, via the pump 23, pipes 29, and a cut-off valve 30, to an outlet of the mixer 3.

During operation, the mixer 3 is activated and ingredients, such as cacao mass (also referred to as liquor), cacao butter, sugar, milk powder lecithin and/or vanalin, preferably having a total fat content of e.g. at least 30 wt %, are fed to the mixer 3 via the inlet 8. When the ingredients have been properly mixed, e.g. after half an hour, the grinder 4 is activated and the mixture is pumped to the grinder 4. The mixture flows through the grinder 4, over the top of the grinder 4, and back into the mixer in one or more cycles. When a desired particle size distribution has been accomplished, the cut-off valve 31 between the mixer 3 and the taste-changer 5 is opened. Subsequently, the cut-off valve 25 between the mixer 3 and the grinder 4 is closed, the taste-changer 5 and the associated ventilator and heating elements are activated in a manner known in itself, and the mixture is circulated through the mixer 3 and the taste-changer 5, e.g. for one and a half hours. The mixture leaving the taste-changer 5 flows back into the mixer 3, whereas the air leaving the taste-changer 5 and containing volatile components of the mixture, such as water and amino acids, is vented, e.g. to a flue. Samples are taken from the mixture and, once the desired properties have been achieved, the mixture is drained from the device 1.

The mixer 3, grinder 4, and taste-changer 5 form a compact and self-contained unit that can be configured such that installation requires no connection of pipes or pumps, i.e. is essentially reduced to positioning the unit and connecting the unit to a source of electricity.

The invention is not restricted to the above-described embodiments, which can be varied in a number of ways within the scope of the claims. For instance, the device can be provided with a first pump for passing mixture from the mixer to the grinder and a second pump for passing mixture from the mixer to the taste-changer. In that case, grinding and taste-changing can be performed simultaneously, reducing processing time.

The invention claimed is:

1. A device for producing chocolate by mixing and grinding ingredients, the device comprising:
   a mixer;
   a ball mill; and
   means for passing a mixture from the mixer to the ball mill, and
   wherein the mixer comprises a toroidal vessel for receiving and mixing the ingredients.

2. The device according to claim 1, wherein the ball mill is located in the central space of the toroidal vessel.

3. The device according to claim 1, wherein the mixer defines a toroidal mixing chamber accommodating at least one mixing element which is rotatable about its axis and/or about the central axis of the toroidal vessel.

4. The device according to claim 2, wherein the mixer defines a toroidal mixing chamber accommodating at least one mixing element which is rotatable about its axis and/or about the central axis of the toroidal vessel.

5. The device according to claim 4, wherein the mixer and the ball mill are coupled to a motor or respective motors via coaxial shafts.

6. The device according to claim 2, wherein the mixer and the ball mill are coupled to a motor or respective motors via coaxial shafts.

7. The device according to claim 3, wherein the vessel is annular.

8. The device according to claim 3, wherein the mixer and the ball mill are coupled to a motor or respective motors via coaxial shafts.

9. The device according to claim 1, wherein the mixer and the ball mill are coupled to a motor or respective motors via coaxial shafts.

10. The device according to claim 1, comprising a taste-changer.

11. The device according to claim 10, comprising a first pump for passing mixture from the mixer to the ball mill and a second pump for passing mixture from the mixer to the taste-changer.

12. The device according to claim 10, wherein the taste changer is connected to an inlet of the mixer.

13. The device according to claim 10, wherein the mixer, the ball mill and the taste changer form a self-contained unit.

14. The device according to claim 1, wherein the mixer and the ball mill form a self-contained unit.

15. The device according to claim 1, wherein the vessel is annular.

16. The device according to claim 1, wherein the ingredients comprise ingredients selected from the group consisting of cacao mass, cacao butter, sugar, and milk powder.

* * * * *